A. K. HUNTLEY.
ELECTRIC BATTERY.
APPLICATION FILED APR. 13, 1920.
1,407,035.
Patented Feb. 21, 1922.
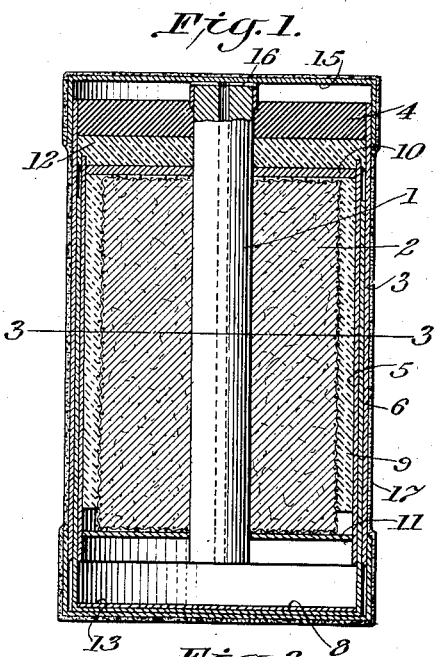
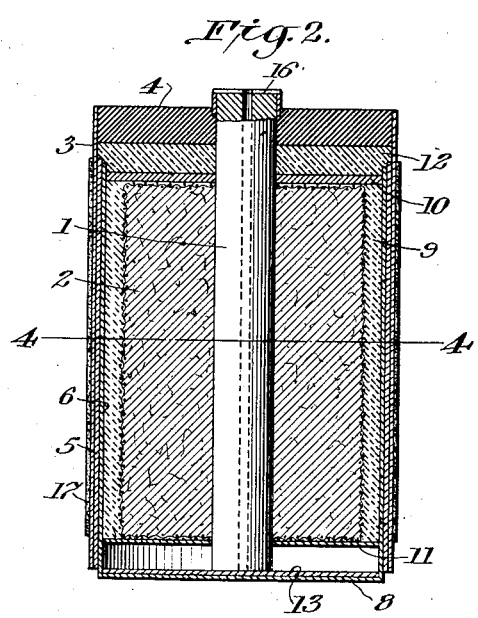
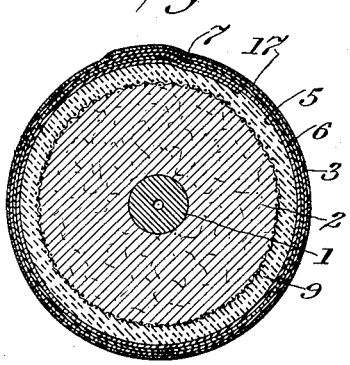
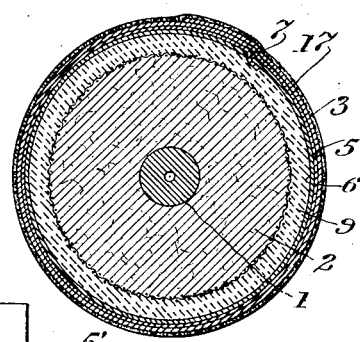
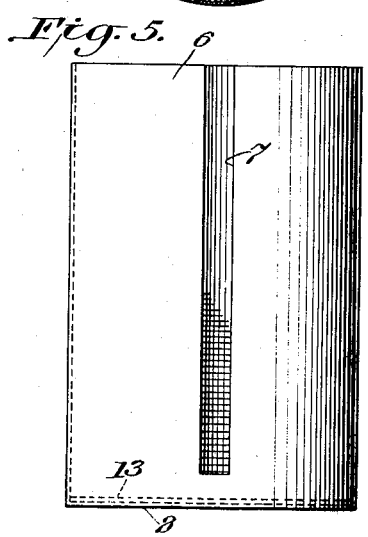
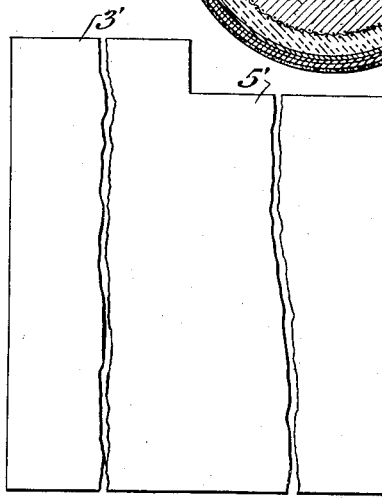
Inventor
Alton Karl Huntley
By Byrnes Townsend & Brickenstein
Attorney

UNITED STATES PATENT OFFICE.

ALTON KARL HUNTLEY, OF CLYDE, OHIO, ASSIGNOR TO NATIONAL CARBON COMPANY, INC., A CORPORATION OF NEW YORK.

ELECTRIC BATTERY.

1,407,035.   Specification of Letters Patent.   Patented Feb. 21, 1922.

Application filed April 13, 1920. Serial No. 373,521.

*To all whom it may concern:*

Be it known that I, ALTON KARL HUNTLEY, a citizen of the United States, residing at Clyde, in the county of Sandusky and State of Ohio, have invented certain new and useful Improvements in Electric Batteries, of which the following is a specification.

This invention relates to an improvement in dry cells of the deferred action type which require some manipulation to render the cell active.

The principal object of the present invention is to secure a cell of the type referred to which requires only a very simple manipulation to render it active.

Other objects will be referred to in connection with the following description of a cell embodying the invention which is similar to an ordinary dry cell.

In the drawings:

Fig. 1 is a central vertical section of a preferred type of cell, the parts being shown in their inactive position.

Fig. 2 is a similar section, the parts being shown in their active positions.

Fig. 3 is a section on the line 3—3 of Fig. 1.

Fig. 4 is a section on the line 4—4 of Fig. 2.

Fig. 5 is a front view of the zinc can.

Fig. 6 is a view of the liner and casing before they have been rolled into cylindrical form.

Referring to the drawings, the bobbin consisting of a cathode comprising a longitudinally perforated carbon electrode 1 and mix 2 of carbon, manganese dioxide and electrolyte solution is substantially the same as the ordinary dry cell bobbin. This is enclosed in a waterproof insulating casing 3 and supported in spaced relation thereto by means of a seal 4 or other suitable closing means in the upper end of the cell. In accordance with the invention I utilize a tubular zinc electrode and protecting liner or membrane which are capable of relative rotation to remove the liner or membrane from the tube to activate the cell. By way of example, I have shown a construction utilizing this feature in which the liner 5 and casing 3 are formed from a single sheet of waterproof insulating material. For purpose of illustration the thickness of the material is somewhat exaggerated.

In Fig. 6 the wider portion 3' serves as the outer casing and the narrow portion 5' serves as the liner when the sheet is rolled into spiral form. The casing and liner are combined with a zinc can 6 having a longitudinal aperture 7 in the side preferably extending from the open upper end down to within a short distance of the lower end which is provided with a bottom 8. The liner portion 5' in the inactive position is coiled inside the can and overlaps therein for a considerable distance, while the remainder 3' of the strip which serves as the casing completely surrounds the outside of the can. At the outer seam of the casing the end is cemented to the surface to secure a leak-proof joint.

The liner, zinc can and casing preferably are coiled so that their surfaces are in close contact. In the space intermediate to the mix and liner I place a relatively thick paste of flour, electrolyte solution and a preservative, such as mercuric chloride. The paste 9 extends approximately to the lower end of the mix and to prevent it from reaching the zinc at the upper and lower ends, insulating discs 10 and 11 are inserted, respectively, in the upper and lower ends of the liner. The upper disc 10 is spaced from the seal 4 and the intermediate space contains a subseal 12 consisting of a layer of soft pitch or other suitable material in which the edges of the liner are embedded. The discs 10 and 11 hold the liner against the zinc. The carbon electrode of the bobbin preferably extends beyond the lower end of the mix and the space between the projecting end and the liner provides an air space when the cell is put into service.

As illustrated in Fig. 1 the zinc can 6 does not extend up to the upper subseal. The paper disc 13 in the bottom of the can is out of contact with the lower end of the perforated carbon electrode. Paper caps 14 and 15 are applied to the ends of the casing and a coating of paraffine 17 is applied to the entire exterior of the article to prevent loss of moisture.

When the cell is to be put in service the caps 14 and 15 are removed and the zinc can 6 is rotated in the proper direction to draw the liner out of the can through the aperture. The rotation coils the liner around the outside of the can, thus removing the insulating layer which protects the zinc in its inactive position. Due to the aperture therein the zinc can is quite flexible and by drawing the liner from the inside to the outside, the can will be contracted somewhat and forced into intimate contact with the paste. To render this more certain as well as to facilitate the rotation of the can, the latter in the inactive condition is not completely inserted in the casing. After putting into action by the relative rotation set forth, the can is pushed toward the upper end so that the upper edge is forced into the upper subseal and the disc 13 in the bottom of the can contacts with the lower end of the perforated electrode. In order to prevent the user from inadvertently closing the upper end of the perforated carbon electrode which serves as a vent, said upper end is provided with one or more slots 16 which prevent accidental closing of the vent when the can is pushed into casing. This feature is claimed in my copending application Ser. No. 358,205, filed February 12, 1920.

By having the bottom of the zinc can of the active cell abutting against the lower end of the carbon electrode, with suitable material therebetween to prevent a short circuit, I am able to combine a number of cells in series by placing the carbon electrode of one cell in electrical contact with the bottom of the zinc can of the adjacent cell.

In case the lining is sufficiently stiff it is possible to also re-insert it between the electrodes by rotating the can in the opposite direction. If the cell is to be used in this manner, it is preferable to allow a portion to extend into the aperture when the cell is rendered active.

Various materials may be utilized for the liner, the principal requisites being that the material should be adapted to withstand the action of the electrolytic paste for long periods without softening or disintegrating. It is also desirable that the liner be made from very thin flexible material. Thin sheet celluloid or oil paper appear to be most satisfactory.

Although I have illustrated and described my invention in connection with the rotatable can in combination with a liner and casing which are integral, it will be evident that, providing the lining be movable relative to the can, it is not essential that the can be rotated; nor is it essential that the liner should constitute an extension of the casing. Any longitudinal division of the can which will permit relative movement of the liner may be used. Numerous details have been described in connection with the modification chosen for illustration but my invention is not limited to these as various modifications may be made within the scope of the claims.

Having described my invention, what I claim is:—

1. In an electric battery of the type described, a combination of a hollow anode having an aperture and an interior insulating lining adapted to be withdrawn through the aperture.

2. In an electric battery of the type described, a combination of a tubular zinc electrode having a longitudinal aperture and an interior flexible lining for said electrode extending through said aperture and adapted to be withdrawn therethrough.

3. In an electric battery of the type described, a combination of a zinc tube having closures for the ends and a longitudinal aperture in the side and an interior lining coiled within the tube extending through the aperture and adapted to be withdrawn therethrough.

4. In an electric battery of the type described, a combination of a hollow zinc electrode having a longitudinal aperture, a jacket surrounding the zinc electrode and an insulating liner within the zinc electrode extending through the aperture and secured to the jacket.

5. In an electric battery of the type described, a combination of a tubular zinc electrode having a longitudinal aperture in the side, a depolarizing mix bobbin in the tube, electrolyte paste surrounding the bobbin, and an insulating liner coiled within the tube surrounding the paste and bobbin and extending through the aperture.

6. In an electric battery of the type described, a combination of a tubular zinc electrode having a metal bottom and a longitudinal aperture in the side, a jacket for the tube, a closure for the other end of the tube, a depolarizing mix bobbin within the tube, a layer of electrolyte paste surrounding the bobbin and a liner of insulating material coiled within the tube exterior to the paste and extending through the aperture.

7. In an electric battery of the type described, a combinaion of a hollow anode having a longitudinal aperture, a depolarizing mix bobbin therein, a jacket surrounding the anode and an insulating liner coiled within the anode, said liner and jacket being integral and having a connecting portion extending through the aperture whereby the liner may be withdrawn therethrough by relative rotation of the anode and liner to coil the liner around the outside of the anode within the jacket.

8. In an electric battery of the type described, a combination of a zinc can having a longitudinal aperture in the side thereof, a liner of insulating material coiled within the can extending through the aperture and adapted to be withdrawn therethrough, a depolarizing mix bobbin having a hollow carbon electrode therein spaced from the bottom of the can and adapted to be moved so as to abut against said bottom when the liner is withdrawn.

In testimony whereof, I affix my signature.

ALTON KARL HUNTLEY.